May 26, 1970     A. OSTRIN     3,513,788
ROTARY INCINERATOR WITH SPINNING CUP BURNER
Filed Oct. 8, 1968     2 Sheets-Sheet 1

INVENTOR.
ALBERT OSTRIN
BY Williamson, Palmatier & Bains
ATTORNEYS

United States Patent Office 3,513,788
Patented May 26, 1970

3,513,788
ROTARY INCINERATOR WITH SPINNING CUP BURNER
Albert Ostrin, 4516 Highway 7,
Minneapolis, Minn. 55416
Filed Oct. 8, 1968, Ser. No. 765,933
Int. Cl. F23g 5/06; F23b 1/32
U.S. Cl. 110—8             7 Claims

ABSTRACT OF THE DISCLOSURE

An incinerator of the rotary kiln type is provided with a conically shaped, rotating cup projecting into the inlet side of the kiln, the cup being rotatably supported within a surrounding air chamber into which combustion air is directed at such an angle as to rotate in the opposite direction from that in which the cup is spinning. Material to be processed by the incinerator, including both combustible and non-combustible solids, liquids and semi-solids, is fed into the rotating burner cup by an auger, and the scrap material will be injected into the kiln in a conical curtain where it will thoroughly mix with and be exposed to the combustion air flowing thereover in an opposite direction.

BACKGROUND OF THE INVENTION

The proper processing of industrial waste, and scrap materials of all types, in incinerators becomes particularly difficult to achieve when the scrap material is comprised of a combination of solid, liquid and highly viscous materials in the nature of semi-solids, with the material to be disposed of being a mixture of both combustible and non-combustibles. It is not uncommon for industrial scrap to be accumulated as a conglomerate mass of such a variety of materials as metals, factory waste such as boxes and rags, combustible liquids including solvents and hydrocarbons of all types, and highly viscous materials such as varnish, glue and heavy oils and greases. Rotary incinerators utilizing rotating combustion chambers have been found to be effective in disposing of such diverse mixtures. However, even the rotating combustion chambers and the devices such as propelling vanes employed in them have not achieved the degree of separation and dispensing of the scrap mixture necessary to accomplish the complete burning of the combustible materials. The principal problem resides in the dispensing of the mass of scrap into the combustion chamber in such a way that maximum exposure of all of the scrap components to the combustion air is achieved, whereby the charge of scrap will be thoroughly burned and cleaned.

BRIEF SUMMARY OF THE INVENTION

Having in mind the foregoing difficulties associated with the handling of conglomerate masses of mixtures of scrap material in incinerators, I have developed an improved feeder arrangement which introduces a mixture of solid, fluid, and semi-solid scrap material into a rotary burner drum in such a way that the combustibles are thoroughly burned, and the non-combustibles are completely cleaned and sterilized.

These basic objectives are realized by the unique combination of a scrap supply auger with a rotating feed cup, the auger serving to feed a slurry or pulp scrap mixture into the spinning cup, and the cup in turn operating to dispense the scrap charge into a rotating combustion drum in a relatively thin curtain for good exposure to combustion air.

In the preferred embodiment of my invention, the scrap dispensing cup is cone shaped and projects concentrically into the rotating combustion chamber. This arrangement has the advantage that the scrap mixture will be thrown outwardly from the flaring cone walls onto the inside walls of the rotating combustion chamber.

A particularly beneficial feature of my invention resides in the provision of a primary air inlet chamber in surrounding relationship to the conical cup, with the primary air being introduced through an annular ring formed between the outer extremities of the conical cup and the air inlet chamber. The combustion air will thus flow inwardly over the outside surface of the feeder cup in intimate contact with the scrap material being discharged from the inside surface of the cup.

As a further advantageous feature of my improved feeder arrangement, I introduce the primary air into the aforesaid inlet chamber in such a direction that the combustion air rotates in a direction opposite to that in which the feeder cup is spinning, whereby oppositely rotating curtains of primary air and scrap material will be formed in the combustion chamber with the result that the scrap components will be thoroughly mixed with and exposed to the air.

The operation of my feeder arrangement is further enhanced by first shredding the solid scrap components into cubes of relatively small size, and then mixing these solid pieces with liquids and semi-solids to form a pulp or slurry which may be readily conveyed by the aforesaid supply auger into the spinning feeder cup.

These and other objects and advantages of my invention will become readily apparent as the following description is read in conjunction with the accompanying drawings wherein like reference numerals have been used to indicate like elements throughout the several views.

BRIEF DESCRIPTION OF THE DRAWINGS

In FIG. 1, I have indicated generally by reference numeral 1 a rotary incinerator of the general type to which my improved feeder apparatus may be applied. For purposes of illustration, incinerator 1 is shown as consisting of a cylindrical, steel drum 2 disposed in a substantially horizontal position on a base frame 3. Drum 2 is rotatably supported on rollers 4 which engage peripheral, steel tracks 5 extending around drum 2. Rollers 4 are mounted on a drive shaft 6 which is driven slowly by a gear reduction motor (not shown). An accumulator or housing 8 communciates with the outlet or egress end of drum 2 and is adapted to receive gaseous products of combustion as well as unburned, non-combustible scrap products. Combustion gases are directed outwardly from housing 8 through conduit 9 into exhaust stack 10.

Figure 1:
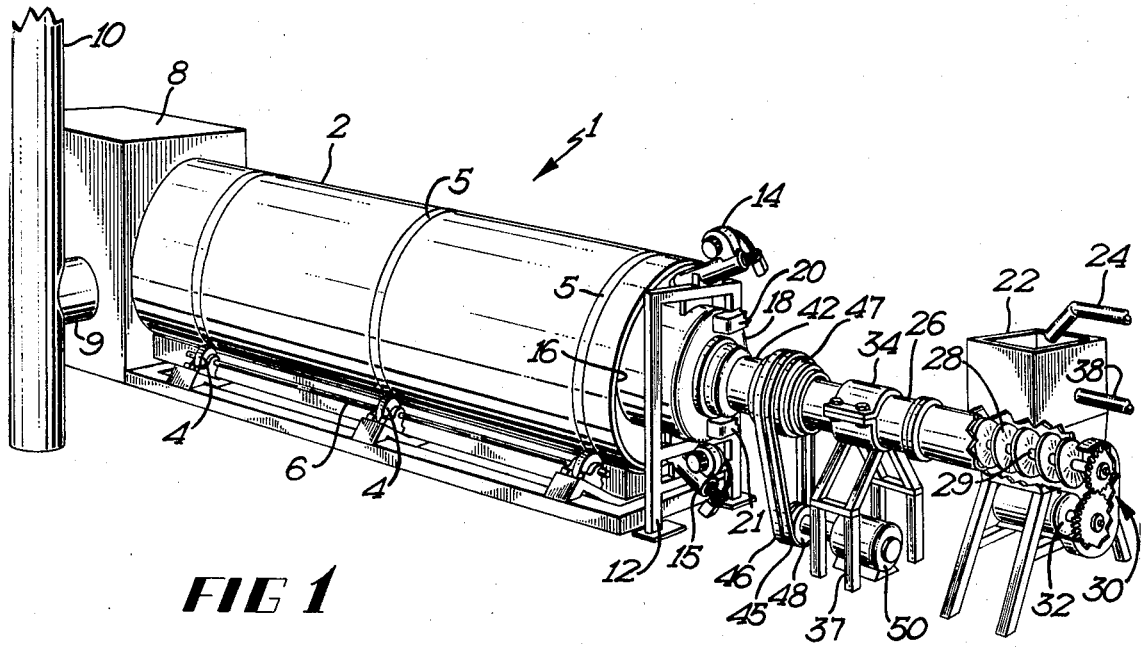
FIG. 1 is a perspective view showing a rotary incinerator having my improved feeder mechanism installed in combination therewith.

Incinerator 1 has been shown and described generally so as to indicate the type of rotary incinerator with which my improved scrap feeding apparatus may be advantageously employed. A rotary incinerator of the type shown in FIG. 1 is more fully shown and described in U.S. Pat. No. 3,269,341 issued to Ostrin et al. on Aug. 30, 1966.

Supported at the forward or inlet end of drum 2 on a frame assembly 12 are pressure burners 14 and 15. Burners 14 and 15 are of the conventional design adapted to burn liquid or gaseous fuel, and project inwardly into drum 2 through circular opening 16 at the inlet end thereof. Although only two burners 14 and 15 have been shown, obviously any number of burners may be employed and positioned in such a way as to achieve maximum combustion of the scrap material being processed by incinerator 1.

Figure 2:
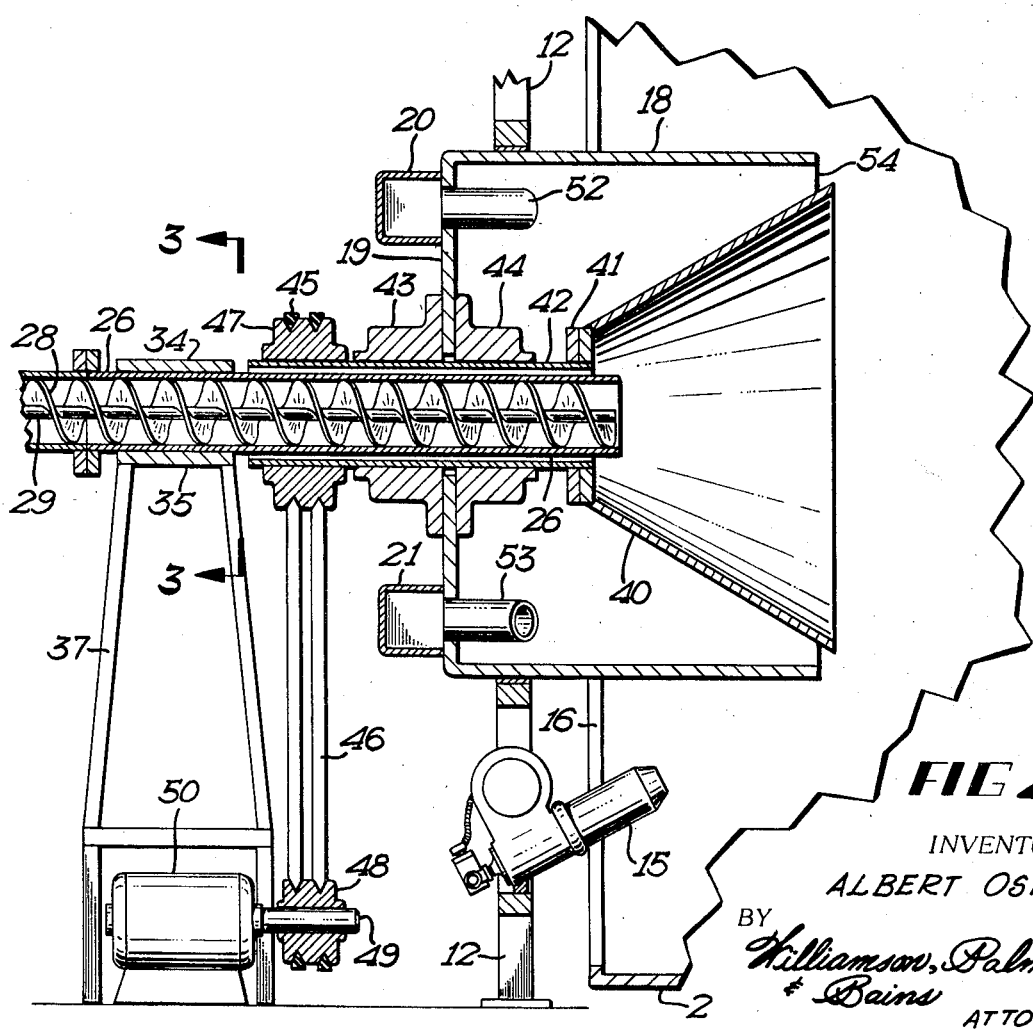
FIG. 2 is an enlarged, vertical section view showing the cooperative relationship of the supply auger, feed cup, and combustion air inlet chamber.
Figure 4:
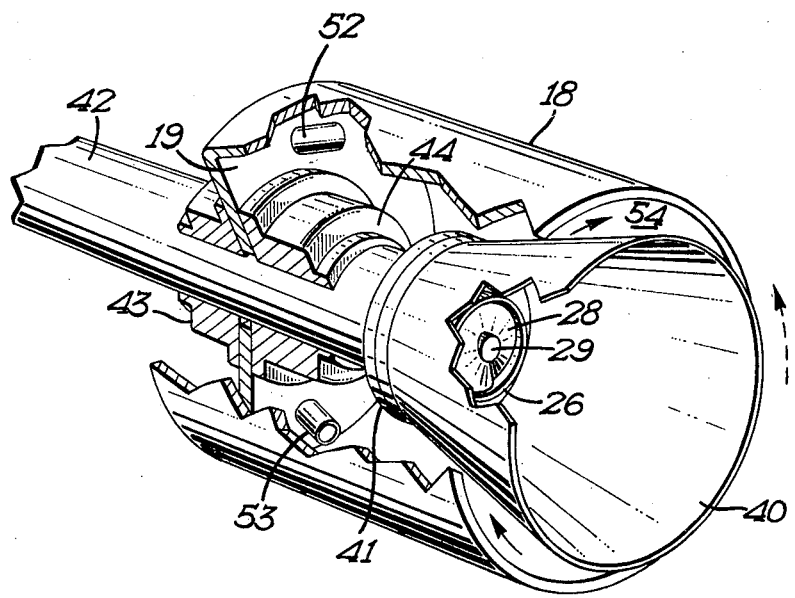
FIG. 4 is a perspective view, partially in section, of the feeder cup and air inlet chamber assembly.

Also supported on upright frame assembly 12 is a primary air inlet chamber 18, preferably of short, cylindrical configuration as is best shown in FIGS. 2 and 4. Primary air supply ducts 20 and 21 are connected to air chamber 18, which is preferably supported concentrically within opening 16 of drum 2 in the manner shown in FIG. 1.

Figure 3:
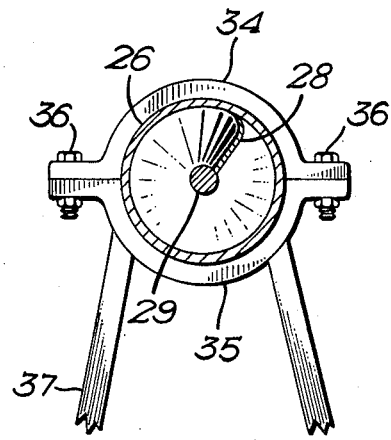
FIG. 3 is a vertical section view of the supply auger taken along lines 3—3 of FIG. 2.

Scrap material to be processed in incinerator 1 is accumulated in hopper 22. Liquids of both a volatile and non-volatile nature may be introduced into hopper 22 through supply conduit 24, and solids, such as general factory refuse, boxes, cans, and metallic scrap of all types, may be dumped into hopper 22 through its top opening. The waste materials introduced into hopper 22 may include oils, grease and chemicals of various types, which when mixed with solid refuse form a relatively viscous conglomerate. Preferably, hopper 22 is supplied substantially continuously with such scrap materials so as to insure a continuous flow of scrap material into incinerator 1. For the purpose of conveying the diverse mixture of scrap into incinerator 1, I provide a supply conduit 26 having a screw auger or helicoid 28 disposed longitudinally therein. Shaft 29 of auger 28 projects through the rear wall of hopper 22 and is driven by a gear train 30, which is preferably powered by a variable speed hydraulic motor 32. Supply conduit 26 is supported within flanged brackets 34 and 35 fastened together at 36 and mounted on frame assembly 37. The disposition of auger 28 within supply conduit 26 is most clearly shown in FIG. 3.

In order to insure the formation of a slurry of proper consistency for conveyance by auger 28, water may be introduced into hopper 22 through pipe 38 shown in FIG. 1. Also, the solid scrap material, both combustible and non-combustible, is preferably shredded in a commercial disintegrator into small cubes approximately four inches in length before being dumped into hopper 22. The mixture of the relatively small solid scrap pieces with liquid in hopper 22 insures the formation of a slurry which is readily conveyable by auger 28. My improved feeder apparatus for ultimately discharging the scrap slurry into rotating drum 2 incorporates as its basic component a rotary cup 40, best shown in FIGS. 2 and 4. For reasons hereinafter set forth, cup 40 preferably takes the shape of a frustrum of a cone, and is provided with a base section 41 supported on an elongated tubular member 42. Tubular member 42 is rotatably supported within bearings 43 and 44 mounted on end wall 19 of air chamber 18. Rotary power is transmitted to tubular member 42 by drive belts 45 and 46 extending around sheaves 47 and 48 secured to tubular member 42 and output shaft 49 of motor 50 respectively. Thus, when motor 50 is operating, tubular member 42 will rotate and cup 40 will spin in a clockwise direction as indicated by the dotted arrows in FIGS. 2 and 4. Conical cup 40 is mounted within primary air inlet chamber 18, with both of these elements projecting into rotating drum 2 in the manner best indicated in FIG. 2. Extending through end wall 19 of air chamber 18 are a pair of stub ducts 52 and 53 which are in fluid flow communication with supply ducts 20 and 21 respectively. Duct members 52 and 53 are angled as shown so as to direct the primary air flowing therethrough around the outside of conical cup 40 in a counterclockwise direction indicated by the solid arrows in FIGS. 2 and 4. Thus, the combustion air and the scrap slurry will be rotating in opposite directions as they are discharged into combustion chamber 2.

In operation, motors 32 and 50 will be started, thereby causing feed auger 28 and conical cup 40 to rotate. The diverse mixture of scrap in supply hopper 22, consisting of shreds of solid material in admixture with liquids and semi-solids, will be conveyed as a slurry towards incinerator 1 by auger 28. As the scrap charge reaches the forward end of supply conduit 26, it will be injected onto the inner surface of spinning cup 40 in a substantially continuous stream at a fairly rapid rate. The rotational speed of cup 40 may vary within a range of approximately 1200 to 2400 r.p.m. depending upon the consistency and combustion characters of the scrap charge being processed; a speed of 1800 r.p.m. would probably be satisfactory for most applications.

The scrap slurry will be thrown from the inner surface of spinning cup 40 into combustion drum 2 in a substantially conical curtain conforming generally to the shape of the outwardly flaring walls of cup 40. The solid scrap components, being of relatively small size, will be suspended in the slurry curtain in good position to be exposed to combustion air and to the flames projecting into drum 2 from burners 14 and 15. Simultaneously with the injection of the scrap material, a continuous stream of primary air will be directed into drum 2 by way of stub ducts 52 and 53 and chamber 18, the air entering drum 2 through annular space 54 between the inner end of cup 40 and chamber 18. A revolving air curtain will thus be injected over the outer surface of cup 40 in intimate surrounding contact with the slurry stream discharging from the inner walls of cup 40. The opposite rotational movement imparted to the air and cone 40 as indicated by the directional arrows in FIG. 4 will cause the conical curtain of scrap material to mix thoroughly with the counter-revolving curtain of combustion air, and the mixture will be ignited by the flames from burners 14 and 15. A burning curtain of scrap material will thus project from spinning cup 40, and the more volatile scrap components will ignite and burn almost immediately upon being introduced into revolving drum 2.

By virtue of the conical shape of cup 40, the scrap slurry will be thrown outwardly onto the inner surface of drum 2, and as drum 2 revolves, the scrap will fall by gravity from the top of drum 2 and be picked up again as it is advanced through the drum by helical vanes or other means. The gaseous products of combustion will pass from housing 8 into exhaust stack 10, and the unburned, non-combustible scrap components will accumulate in housing 8, from which they may be removed through an access door, not shown. The temperature in revolving drum 2 will be maintained sufficiently high that burning of the scrap material will take place throughout substantially the entire length thereof.

Burners 14 and 15 supplement the burning action at the outlet of spinning cup 40, and serve as additional heat sources to keep the scrap burning at it moves through drum 2. In some applications, one supplemental burner may suffice, or none may be required, in which case a separate igniter would be used to start the scrap burning as it comes off of spinning cup 40.

Introducing the scrap into drum 2 from rotating cup 40 as a curtain of slurry rotating countercurrently with respect to a surrounding curtain of combustion air permits a maximum surface area of the scrap material to be exposed to and mixed with the primary, combustion air. As a result, a thorough and complete burning of the scrap material takes place with the combustible components being totally disintegrated and the non-combustible scrap articles, such as pieces of metal, being extremely well cleaned and sterilized. The burning and cleaning of solids is enhanced by shredding the solids into small pieces before introducing them into hopper 22. The small, non-combustible solids are so well exposed to combustion air in the aforesaid slurry curtain that contaminants on the solid pieces are completely burned off. The thoroughly sterilized, non-combustible solids may then be recovered from housing 8 and disposed of in a land-fill operation without fear of contaminating the ground waters at dump sites.

Those skilled in the art will readily appreciate that the improved burner and feed arrangement described above renders a rotary incinerator an extremely efficient and economical means for processing conglomerate mixtures of industrial and commercial scrap. I contemplate that various changes may be made in the form, arrangement and proportions of the various parts without departing from the spirit and scope of my invention as defined by the following claims.

I claim:
1. Scrap feed and burner apparatus for an incinerator comprising:
 - a scrap supply auger having its supply and positioned in contact with a source of scrap in the form of a conglomerate mixture of solid, liquid and semi-solid scrap materials, and its discharge end disposed adacent the inlet of an incinerator;
 - a rotatably mounted feed cup projecting within said incinerator inlet in surrounding relation to said discharge end of said supply auger;
 - a combustion air inlet in said incinerator for directing air thereinto;
 - means for igniting said scrap materials within said incinerator at the outlet of said feed cup, and
 - drive means for rotating said auger and said feed cup, whereby said scrap materials wil be conveyed into said cup by said auger and thereafter propelled into said incinerator by said rotating cup in a spinning curtain for good exposure to and mixture with said combustion air.

2. Apparatus as defined in claim 1 wherein;
said incinerator is in the form of a rotary drum having said inlet in one end thereof; and
said feed cup is cone-shaped, with side walls which are outwardly towards the inside surfaces of said drum.

3. Apparatus as defined in claim 1 wherein:
said combustion air inlet is in the form of a chamber within which said feed cup is supported, said chamber having an opening in the inner end thereof through which air may flow into said incinerator over the outer surface of said feed cup.

4. Apparatus as defined in claim 3 wherein:
said feed cup is disposed concentrically within said air chamber opening, thereby forming an annular space through which air may flow evenly over the entire outer surface of said cup into said incinerator in intimate contact with the scrap material discharging from the inside of said cup.

5. Apparatus as defined in claim 3 and further including:
air duct means in fluid flow communication with the interior of said air chamber, said duct means being so angled as to cause combustion air to move towards said air chamber opening in a rotary motion counter to that in which said feed cup revolves.

6. Apparatus as defined in claim 4 wherein:
said feed cup is in the general configuration of a frustrum of a cone having side walls which flare outwardly towards said air chamber opening and the inside surface of said incinerator.

7. Apparatus as defined in claim 4 and further including:
an auxiliary burner projecting into said incinerator adjacent said feed cup, said auxiliary burner serving as said means for igniting said scrap materials.

References Cited
UNITED STATES PATENTS

| | | | |
|---|---|---|---|
| 3,269,341 | 8/1966 | Ostrin et al. | 110—14 |
| 3,366,080 | 1/1968 | Albertson | 110—8 |
| 3,396,168 | 8/1968 | Hubbard | 110—8 |

KENNETH W. SPRAGUE, Primary Examiner

U.S. Cl. X.R.
110—14

UNITED STATES PATENT OFFICE
CERTIFICATE OF CORRECTION

Patent No. 3,513,788    Dated May 26, 1970

Inventor(s) Mr. Albert Ostrin

It is certified that error appears in the above-identified patent and that said Letters Patent are hereby corrected as shown below:

In claim 2, column 5, line 34, (second to last line) change "are" to --flare--.

SIGNED AND SEALED

SEP 29 1970

(SEAL)
Attest:

Edward M. Fletcher, Jr.
Attesting Officer

WILLIAM E. SCHUYLER, JR.
Commissioner of Patents

FORM PO-1050 (10-69)